United States Patent [19]
Kitabayashi et al.

[11] Patent Number: 5,909,533
[45] Date of Patent: Jun. 1, 1999

[54] ELECTRIC COOKING OVEN WITH INFRARED GAS BROILER

[75] Inventors: Joey Kitabayashi, La Mirada; Humberto Delgado, El Monte, both of Calif.; Carl H. Adams, Paradise Valley, Ariz.; Gengxin Feng, Covina, Calif.

[73] Assignee: Dacor, Inc., Pasadena, Calif.

[21] Appl. No.: 09/055,977

[22] Filed: Apr. 6, 1998

[51] Int. Cl.[6] .................................................. F24C 1/00
[52] U.S. Cl. ........................... 392/310; 392/307; 219/395
[58] Field of Search .................................... 392/310, 307; 219/400, 395; 126/273 R, 275 R, 275 E; 431/132, 254, 258, 259, 263

[56] References Cited

U.S. PATENT DOCUMENTS

| | | | |
|---|---|---|---|
| 1,475,608 | 11/1923 | Tempe | 392/310 |
| 1,495,685 | 5/1924 | Graf | 392/310 |
| 1,815,088 | 7/1931 | Allen et al. | 392/310 |
| 2,463,712 | 3/1949 | Newell | 392/310 |
| 2,969,450 | 1/1961 | Bernstein | 392/310 |
| 3,157,390 | 11/1964 | Douglas | 392/310 |
| 3,423,568 | 1/1969 | Meckley, III et al. | 392/310 |
| 5,665,302 | 9/1997 | Benni et al. | 266/80 |

*Primary Examiner*—Teresa Walberg
*Assistant Examiner*—Vinod D. Patel
*Attorney, Agent, or Firm*—Lyon & Lyon LLP

[57] ABSTRACT

A cooking oven having an electric heating element in the bottom for baking, warming and high temperature-self cleaning, and an infrared gas broiler in the top of the oven. The infrared gas broiler is supplied with a fuel gas/air mixture from a venturi tube that uses the stream of fuel gas to draw clean air into the oven from outside the oven. A flue duct is provided in the top rear of the oven for the discharge of the combusted gases but no other opening is provided, such as for secondary air that is normally required for a gas oven. The venturi tube assembly creates a fuel gas/air mixture that contains 100% of the air necessary for full combustion of that gas and a positive pressure for distributing the gas/air mixture through ceramic radiants for combustion to heat the radiants to a temperature for producing the infrared light waves. The positive pressure created within the oven by the gas/air mixture and combustion causes a continual discharge of the hot gases from the oven through a flue duct without a draft normally created by the introduction of secondary air.

19 Claims, 2 Drawing Sheets

ELECTRIC COOKING OVEN WITH INFRARED GAS BROILER

This invention relates to cooking ovens and, in particular, cooking ovens that have plural operating modes including broiling and baking.

Conventional domestic and commercial ovens that are used for cooking food often have plural modes for cooking, such as broiling, baking, warming, self-cleaning and the like, and such ovens commonly use either gas or electricity but not both, although some modern ovens also include microwave as a heating source. Electric ovens have certain well known advantages over gas ovens, such as being substantially completely sealed to retain all of the heat for efficiency whereas a gas oven must have a fresh air inlets for both primary air and secondary air, and a vent for discharging the combusted gases. Conversely, gas ovens have certain well known advantages over electric ovens, such as more even heat for broiling. In particular, infrared gas broilers provide extremely uniform and high temperature broiling heat that is not possible with electric heating element broilers that have a limited number of heating element rods spaced a significant distance apart that produce uneven heating.

Accordingly, it is a principal object of this invention to provide a cooking oven that combines an infrared gas broiler in an otherwise electrically heated oven.

A further object of this invention is to provide a combination infrared gas broiler and electric oven which is completely closed except for the introduction of primary air with the fuel gas for combustion and a flue for venting the combusted gases, whereby secondary air is not permitted to flow through the oven to cause inefficiencies.

Other and more detailed objects and advantages of this invention will appear from the following description and the accompanying drawings, wherein.

Figure 1:
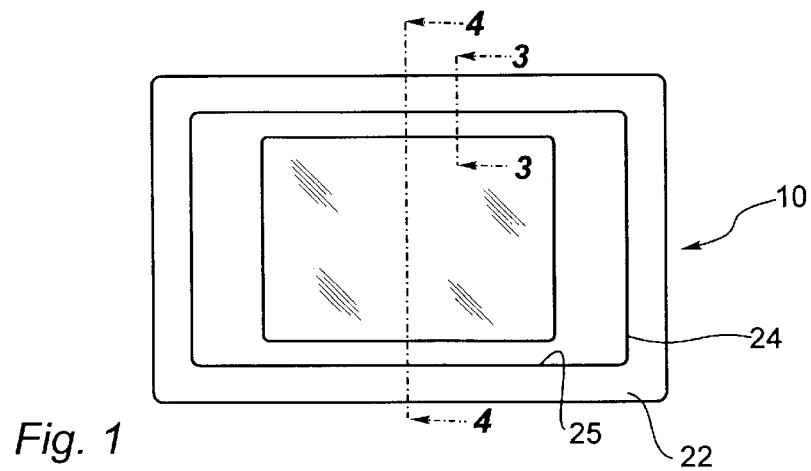
FIG. 1 is a front elevation view of the oven of the present invention.

Referring now in detail to the drawings, the oven, generally designated 10, of this invention is shown diagrammatically as an oven cell with six insulated and closed walls, namely, a top wall 12, a bottom wall 14, a right side wall 16, a left side wall 18, a rear wall 20 and a front wall 22. The front wall 22 is provided with a conventional door 24 that is tightly sealed in the door opening 25 in the front wall 22 when the door 24 is closed, in a conventional manner common to electric ovens. The top wall 12, bottom wall 14, right side wall 16 and left side wall 18 are completely closed, as are the joints between all of the walls, whereby no inefficient exchange of air between the inside and the outside of the oven 10 occurs through those walls and joints. As will appear below, the rear wall 20 has only those openings that are required for the operating components of the oven 10.

An electric heating element 26 is provided in the bottom of the interior of the oven 10 in a conventional manner for heating the interior of the oven during conventional modes of operation, such as preheating, warming baking, high temperature cleaning and the like. The interior of each of the side walls 16 and 18 is provided with a conventional grate rack 28 for supporting a rod type grate 30 at any desired level within the oven for in turn supporting a pan 32 or the like for receiving the food to be cooked.

A gas broiler, generally designated 34, is provided on the upper interior surface of the oven and attached to top wall 12. Gas broiler 34 is preferably of the infrared burner type having ceramic radiants 36, three of which are shown for this size oven, that are thin ceramic tile-like elements with a multiplicity of small holes 38 extending vertically therethrough which allows a mixture of fuel gas and air to pass downwardly through the ceramic radiants 36 and burn along the bottom surface of the radiants 36. The gas/air combustion extends over substantially the entire lower surfaces of the ceramic radiants 36 to thereby heat the ceramic radiants to temperatures of about 1600° F. In turn, the heated ceramic radiants create infrared light waves that peak at about 2.8 microns and radiate downwardly in all directions from the ceramic radiants 36 to evenly heat and broil food items placed in the oven pan 32. The combustion of the fuel gas/air mixture along the bottom surface of the ceramic radiants 36 is very even and continuous during broiling and therefore the intensity of the broiling action on the food is adjusted by adjusting the distance of the food from the ceramic radiants 36, such as by using different levels of support for the grate 30 on the grate racks 28.

The infrared gas broiler 34 includes a venturi tube assembly, generally designated 40, comprised of a cylindrical outer tube 42, a long frustoconical tube 43, a short frustoconical tube 44 and a gas jet fitting 45. The long frustoconical tube 43 and the short frustoconical tube 44 are joined at their smaller, open ends to form a venturi opening or orifice 46 through which the fuel gas is discharged from the gas jet fitting 45 by a jet opening 47 to thereby draw primary air into the venturi tube assembly 40 through the rear opening 48 in the cylindrical tube 42. The venturi tube assembly 40 is of a substantial length and the long frustoconical tube 43 preferably has a very small angle of inclination of its sides, such as about 2 degrees. By this arrangement, a substantially stoichiometric mixture of fuel gas and air is created in the long frustoconical tube 43, which mixture will then burn completely and efficiently in the combustion that occurs on the lower surface of the ceramic radiants 36. The fuel gas may be natural gas, propane or any other appropriate gas at an appropriate pressure for producing the desired gas/air mixture and flow in the gas broiler 34. The fuel gas is supplied through a line 49 in a conventional manner.

The gas broiler 34 includes a plenum 50 formed by a box formed above and around the ceramic radiants 36, which box also supports the ceramic radiants 36. The venturi tube assembly 40 extends into the plenum 50 and the outer cylindrical tube 42 is in sealed relationship with an opening 52 in the box forming the plenum 50. An L-shaped baffle 54 is provided at the discharge end 56 of the venturi tube assembly 40 for more evenly distributing the gas/air mixture into the plenum 50. Additional baffles may be provided in plenum 50 at appropriate locations for enhancing the even distribution of the gas/air mixture to all of the holes 38 in the ceramic radiants 36. The venturi tube assembly 40 with the jet of fuel gas from gas jet fitting 45 creates a positive pressure in plenum 50 that is higher than atmospheric pressure, thereby forcing the gas/air mixture through the holes 38 in the ceramic radiants 36 in a substantially even manner which produces a substantially even sheet of flame along the bottom surface of the ceramic radiants 36. The perimeter of the ceramic radiants 36 are sealed to each other and the box by gaskets, such as ceramic fiber gaskets, for assuring that the gas/air mixture flows only through the holes 38 in an manner.

Figure 2:
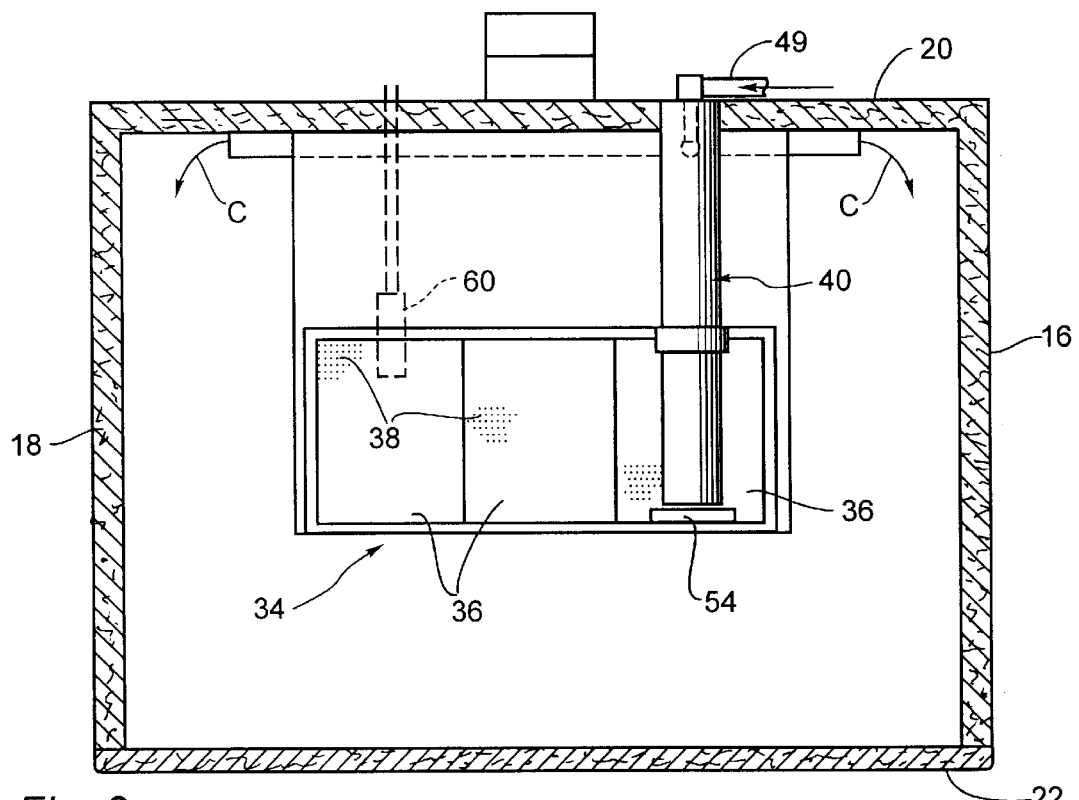
FIG. 2 is a sectional plan view of the oven of this invention taken on the line 2—2 in FIG. 1.
Figure 3:
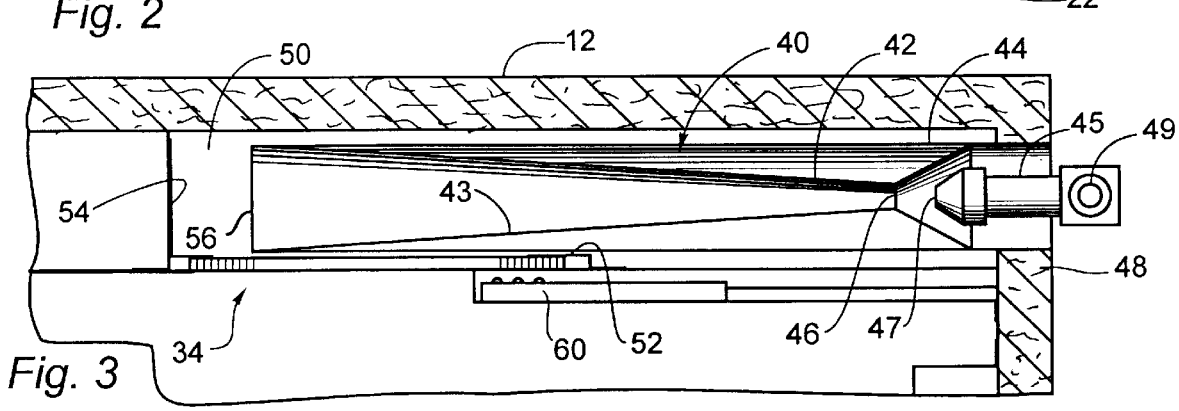
FIG. 3 is a fragmentary sectional elevation view of the venturi tube portion of the oven of this invention taken substantially on the line 3—3 in FIG. 1.

An igniter 60 is provided immediately below one of the ceramic radiants 36 for igniting the gas/air mixture. Preferably the igniter 60 is a hot surface type igniter having an electrical resistance wire positioned close to the bottom surface of the ceramic radiant 36, although other types of igniters may be used, such as a spark igniter. The resistance wire of igniter 60 is maintained in a red hot condition continually while the gas broiler 34 is in operation to assure that the gas/air mixture is continually ignited or reignited if the flame is inadvertently extinguished. As shown in FIG. 2, it is preferable that the igniter 60 be spaced laterally from the venturi tube assembly 40 to avoid unduly heating the venturi tube assembly.

Figure 4:
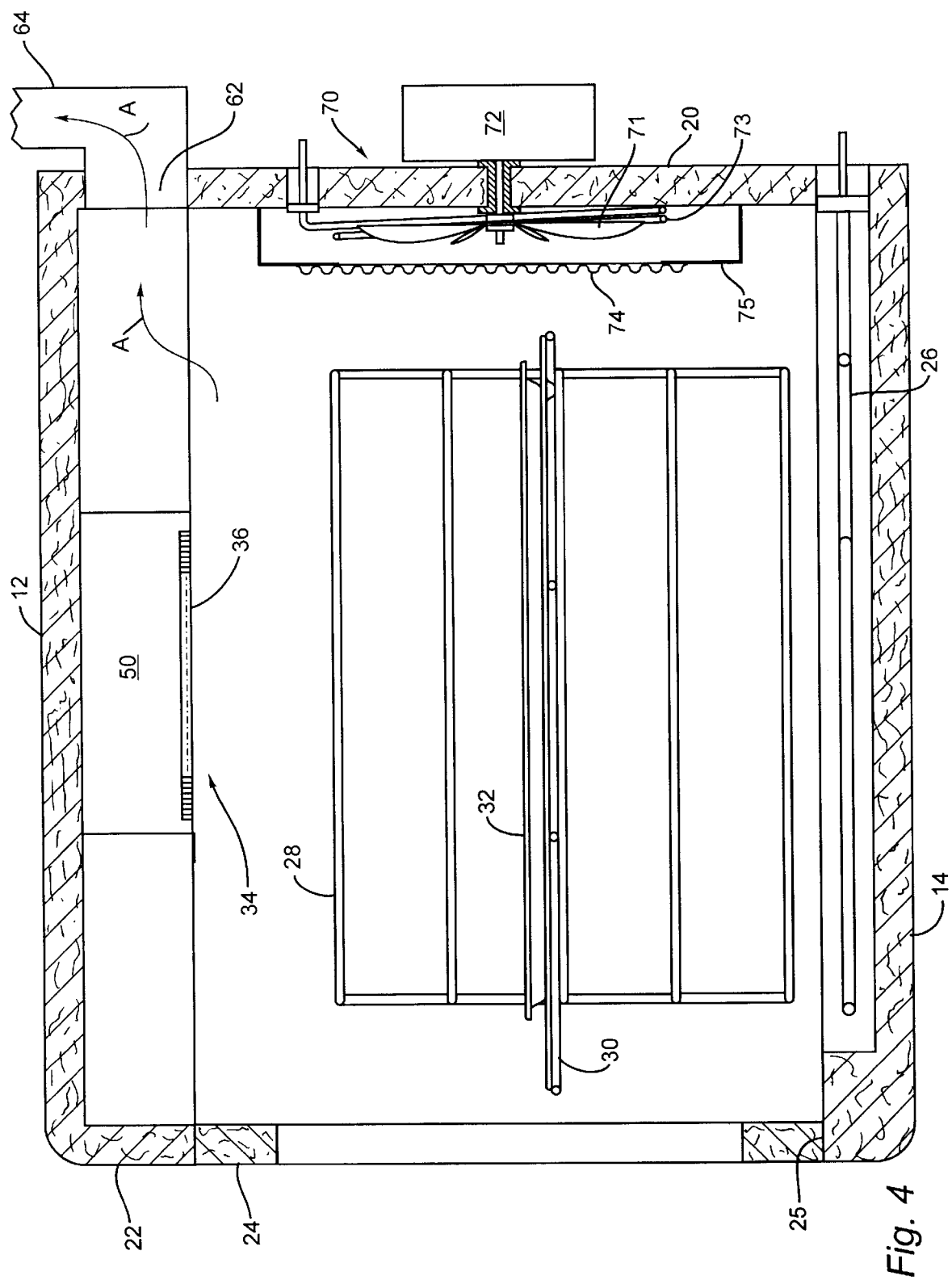
FIG. 4 is a sectional elevation view of the oven of this invention taken substantially on line 4—4 in FIG. 1.

The operation of the oven 10 will now be described. The electric heating element 26 and the gas broiler 34 are provided with separate controls (not shown) of a conventional type such that when the electric heating element 26 is energized, the gas broiler 34 is shut-off and conversely when the gas broiler 34 is activated, the electric heating element 26 is off. A conventional temperature control can be provided in connection with the electric heating element 26 for controlling the temperature of the entire oven to the desired level during baking or warming. A temperature control may also be provided with the gas broiler 34 to prevent an excessively high temperature in the oven but normally the broiling mode will be continued at the highest temperature that the gas broiler 34 can produce until broiling of the food item is completed. When the broiling mode is desired and the controls are appropriately set, the fuel gas from line 49 will be discharged through the opening 47 of gas jet fitting 45 into the orifice 46 in the venturi tube assembly 40 to draw in fresh air through the opening in the open end 48 of the tube 42 extending through the rear wall 20 and the gas/air mixture is discharged from the venturi tube assembly 40 into the plenum 50 to create a positive pressure to force the gas/air mixture evenly through all of the holes 38 in the ceramic radiants 36. The control for starting the operation of the gas broiler 34 also energizes the igniter 60 for igniting the gas/air mixture being discharged downwardly through the holes 38 in the ceramic radiants 36, whereby the combustion raises the temperature of the ceramic radiants to about 1600° F for producing infrared light rays for broiling. The discharge of the gas/air mixture through the holes 38 and the combustion creates a positive pressure in the interior of the oven pan that is higher than atmospheric pressure. As a result, the combusted gases and heated air from within the oven rise to the top and are forced through an opening 62 in the top of the rear wall 20 into a vent pipe or flue duct 64 to the outside, as shown by arrows A in FIG. 4. Since there are no other openings into the interior of oven 10, such as an opening in the bottom wall 14 that normally is provided in a gas oven for adding secondary air, the positive pressure created by the venturi tube assembly 40 and combustion of the gas/air mixture produces a forced natural draft for the hot gases to be discharged through the flue duct 64, both because the gases are hotter than the ambient temperature and the internal pressure in the oven is higher than atmospheric pressure. By this arrangement, the combusted gases are efficiently and completely discharged from the oven during gas broiler operation and yet the electric oven mode of operation is not severely compromised by the continual passage of secondary air from an opening in the bottom wall 14 and out through the flue duct 64, as occurs in a conventional all gas oven. The ceramic radiants 36 also serve to thermally insulate the plenum 50 from the flames to thereby prevent premature combustion of the gas/air mixture in the plenum.

If desired, the oven 10 may also be provided with a conventional convection oven assembly, generally designated 70, on the rear wall 20. The convection oven assembly 70 includes a fan 71 driven by an electric motor 72 and surrounded by a heating element 73 for drawing air from the interior of the oven through a metal screen filter 74 mounted in the front of an enclosure 75 and discharging that air back into the oven from the right and left ends of the enclosure 75, as shown by arrows C in FIG. 2. Normally, the convection oven assembly 70 would be selectively operable when the oven is being used for baking with the electric heating element 26 energized but it may also be desirable to activate the convection oven assembly 70 during some food broiling operations when the gas broiler 34 is in operation.

While a specific embodiment of the present invention has been described in detail above, it is to be understood that various modifications, substitutions and additions may be made without departing from the spirit and scope of the present invention. For example, a specific type of infrared gas broiler 34 has been described in detail with a specific venturi tube assembly 40 located in a specific manner but other types of gas broilers and venturi tubes and locations may be used.

What is claimed:

1. A cooking oven comprising, an oven cell having an electrical heating element mounted in the bottom and a gas broiler mounted in the top, said gas broiler having a venturi tube and a gas jet for supplying fuel gas and drawing air into said venturi tube from outside said oven cell to supply a fuel gas/air mixture for combustion, a flue duct outlet from said closed oven cell and;

said supplying of the fuel gas/air mixture by said venturi tube and combustion of the fuel gas/air mixture producing a positive pressure and elevated temperature in said oven cell to cause the gases of combustion to be discharged through said flue duct outlet.

2. A cooking oven according to claim 1, wherein said gas broiler includes a ceramic radiant with a multiplicity of holes therethrough for the passage of the gas/air mixture and combustion occurs on a bottom surface of said ceramic radiant for heating said ceramic radiant to a sufficient temperature for producing infrared waves.

3. A cooking oven according to claim 2, wherein said gas broiler includes a plenum above said ceramic radiant and said venturi tube is connected to said plenum for supplying the gas/air mixture to and through said plenum to said multiplicity of holes in said ceramic radiant.

4. A cooking oven according to claim 3, wherein said venturi tube creates a positive pressure of gas/air mixture in said plenum.

5. A cooking oven according to claim 2, wherein an igniter is positioned adjacent said bottom surface of said ceramic radiant, said igniter having an electrical resistance wire that is continually energized while said gas broiler is operating for maintain the combustion of the fuel gas/air mixture.

6. A cooking oven according to claim 1, wherein an igniter is positioned adjacent said gas broiler and is operable for continually igniting the fuel gas/air mixture.

7. A cooking oven according to claim 1, wherein said oven cell is provided with a door in a door opening for selective access, and said door opening, said venturi tube and said flue duct outlet comprise the only openings in said oven cell to outside said oven cell.

8. A cooking oven according to claim 1, 2, 3, 4, 5, 6 or 7, wherein said oven includes separate controls for separately controlling said electrical heating element and said gas broiler for full oven heating by said electrical heating element without broiling and broiling by said gas broiler without full oven heating by said electrical heating element.

9. A cooking oven comprising,
- a closed oven cell having an electrical heating element mounted in the bottom and a gas broiler mounted in the top,
- said gas broiler having a venturi tube and a gas jet for supplying fuel gas and drawing air into said venturi tube from outside said closed oven cell to supply a fuel gas/air mixture for combustion,
- an igniter positioned for igniting said fuel gas/air mixture and having means for continually maintaining combustion,
- a flue duct outlet from said closed oven cell in an upper portion,
- said venturi tube, said flue duct outlet and an oven door opening comprising the only openings between the inside and outside of said closed oven cell, and
- said supplying of the fuel gas/air mixture by said venturi tube and gas jet and the combustion of said fuel gas/air mixture producing a positive pressure and elevated temperature in said closed oven cell to cause the combustion gases to be discharged through said flue duct outlet.

10. A cooking oven according to claim 9, wherein said oven includes separate controls for separately controlling said electrical heating element and said gas broiler for full oven heating by said electrical heating element without broiling and broiling by said gas broiler without full oven heating by said electrical heating element.

11. A cooking oven according to claim 9, wherein said gas broiler includes a ceramic radiant with a multiplicity of holes therethrough for the passage of the gas/air mixture and combustion occurs on a bottom surface of said ceramic radiant for heating said ceramic radiant to a sufficient temperature for producing infrared waves.

12. A cooking oven according to claim 11, wherein said gas broiler includes a plenum above said ceramic radiant and said venturi tube is connected to said plenum for supplying the gas/air mixture to and through said plenum to said multiplicity of holes in said ceramic radiant.

13. A cooking oven according to claim 12, wherein said venturi tube creates a positive pressure of gas/air mixture in said plenum.

14. A cooking oven according to claim 11, wherein said igniter is positioned adjacent said bottom surface of said ceramic radiant, said igniter having an electrical resistance wire that is continually energized while said gas broiler is operating for maintain the combustion of the fuel gas/air mixture.

15. A cooking oven comprising,
- a closed oven cell having insulated and closed top, bottom, two side, rear and front walls with a door in said front wall,
- an electrical heating element mounted in said closed oven cell adjacent said bottom wall for use in full oven heating,
- an infrared gas broiler mounted in said closed oven cell adjacent said top wall for broiling,
- said gas broiler having flame holes opening downwardly,
- said gas broiler having a venturi tube assembly extending through said rear wall,
- said venturi tube assembly having a gas jet for supplying fuel gas and drawing air into said venturi tube assembly from outside said oven cell to supply a fuel gas/air mixture to said flame holes for combustion,
- an igniter positioned adjacent said flame holes for igniting said fuel gas/air mixture and maintaining combustion,
- a flue duct outlet from said closed oven cell in an upper portion of said rear wall,
- said supplying of the fuel gas/air mixture by said venturi tube assembly and the combustion of the fuel gas/air mixture producing a positive pressure and elevated temperature in said closed oven cell to cause the combustion gases to be discharged through said flue duct outlet, and
- separate controls for separately controlling said electrical heating element and said gas broiler for full oven heating by said electrical heating element without broiling and broiling by said gas broiler without full oven heating by said electrical heating element.

16. A cooking oven according to claim 15, wherein said gas broiler includes a ceramic radiant with a multiplicity of holes therethrough for the passage of the gas/air mixture and combustion occurs on a bottom surface of said ceramic radiant for heating said ceramic radiant to a sufficient temperature for producing infrared waves.

17. A cooking oven according to claim 16, wherein said gas broiler includes a plenum above said ceramic radiant and said venturi tube is connected to said plenum for supplying the gas/air mixture to and through said plenum to said multiplicity of holes in said ceramic radiant.

18. A cooking oven according to claim 17, wherein said venturi tube creates a positive pressure of gas/air mixture in said plenum.

19. A cooking oven according to claim 16, wherein said igniter is positioned adjacent said bottom surface of said ceramic radiant, said igniter having an electrical resistance wire that is continually energized while said gas broiler is operating for maintain the combustion of the fuel gas/air mixture.

* * * * *